(12) United States Patent
Graca et al.

(10) Patent No.: US 10,941,361 B2
(45) Date of Patent: Mar. 9, 2021

(54) METHOD AND SYSTEM FOR CONTROLLING SOOT MAKE IN SYNTHESIS GAS PRODUCTION

(71) Applicant: AIR PRODUCTS AND CHEMICALS, INC., Allentown, PA (US)

(72) Inventors: Mario Guilherme Santos Graca, Amsterdam (NL); Bart Van Krimpen, Amsterdam (NL); Jose Atilio Quevedo-Enriquez, Amsterdam (NL); Thomas Christiaan Van Tergouw, Amsterdam (NL); Joachim Ottomar Wolff, Amsterdam (NL)

(73) Assignee: Air Products and Chemicals, Inc., Allentown, PA (US)

( * ) Notice: Subject to any disclaimer, the term of this patent is extended or adjusted under 35 U.S.C. 154(b) by 106 days.

(21) Appl. No.: 16/469,432

(22) PCT Filed: Dec. 14, 2016

(86) PCT No.: PCT/EP2016/081065
§ 371 (c)(1),
(2) Date: Jun. 13, 2019

(87) PCT Pub. No.: WO2018/108270
PCT Pub. Date: Jun. 21, 2018

(65) Prior Publication Data
US 2020/0017783 A1     Jan. 16, 2020

(51) Int. Cl.
*C10J 3/72*       (2006.01)
*B01D 47/06*     (2006.01)
(Continued)

(52) U.S. Cl.
CPC ............ *C10J 3/723* (2013.01); *B01D 47/06* (2013.01); *B01D 47/10* (2013.01); *C10J 3/84* (2013.01); *C10J 2300/1823* (2013.01)

(58) Field of Classification Search
CPC ..................................................... C10J 3/84
See application file for complete search history.

(56) References Cited

U.S. PATENT DOCUMENTS

| 4,390,348 A | 6/1983 | Dille et al. |
| 4,632,766 A * | 12/1986 | Firnhaber ............... C02F 9/00 210/752 |

(Continued)

FOREIGN PATENT DOCUMENTS

CN     1588332 A     3/2005

OTHER PUBLICATIONS

European International Search Report and Written Opinion of the International Searching Authority, dated Jul. 21, 2017, for PCT/EP2016/081065.

*Primary Examiner* — Matthew J Merkling
(74) *Attorney, Agent, or Firm* — Amy Carr-Trexler

(57) ABSTRACT

The present application provides a method for controlling soot make in a process for the gasification of a liquid carbonaceous feedstock. The gasification process comprises: partially oxidizing the carbonaceous feedstock in a gasifier to produce syngas; guiding the syngas from an outlet of the gasifier to a quench section; cooling the syngas in the quench section to provide cooled syngas; providing the cooled syngas to a soot removal unit; using the soot removal unit to remove solids from the cooled syngas, the soot removal unit providing a cleaned syngas stream and a waste slurry stream comprising the solids removed from the syngas; continuously monitoring a concentration of total suspended solids (TSS) in the waste slurry stream; providing the concentration of total suspended solids (TSS) to a control system. The (Continued)

control system continuously optimizes the gasification process to changes in concentration of total suspended solids, carbon-to-ash ratio, and optional additional parameters.

20 Claims, 7 Drawing Sheets

(51) Int. Cl.
 *B01D 47/10* (2006.01)
 *C10J 3/84* (2006.01)

(56) References Cited

U.S. PATENT DOCUMENTS

| | | |
|---|---|---|
| 4,666,462 A | 5/1987 | Martin |
| 9,085,472 B2 * | 7/2015 | Chinnadurai ............ C10J 3/466 |
| 2009/0101598 A1 * | 4/2009 | Kain ........................ C10K 1/10 |
| | | 210/771 |
| 2009/0178338 A1 * | 7/2009 | Leininger ................. F23G 5/02 |
| | | 48/86 R |
| 2011/0289847 A1 * | 12/2011 | Shaw ......................... C10J 3/84 |
| | | 48/202 |
| 2012/0198768 A1 * | 8/2012 | Khosravian ............ C10K 1/101 |
| | | 48/61 |
| 2014/0202068 A1 | 7/2014 | DePuy et al. |
| 2014/0263045 A1 * | 9/2014 | Mazumdar .............. C02F 3/006 |
| | | 210/612 |
| 2015/0218469 A1 * | 8/2015 | Sastri ....................... C02F 1/06 |
| | | 252/373 |
| 2016/0048113 A1 | 2/2016 | Pandurangan et al. |

* cited by examiner

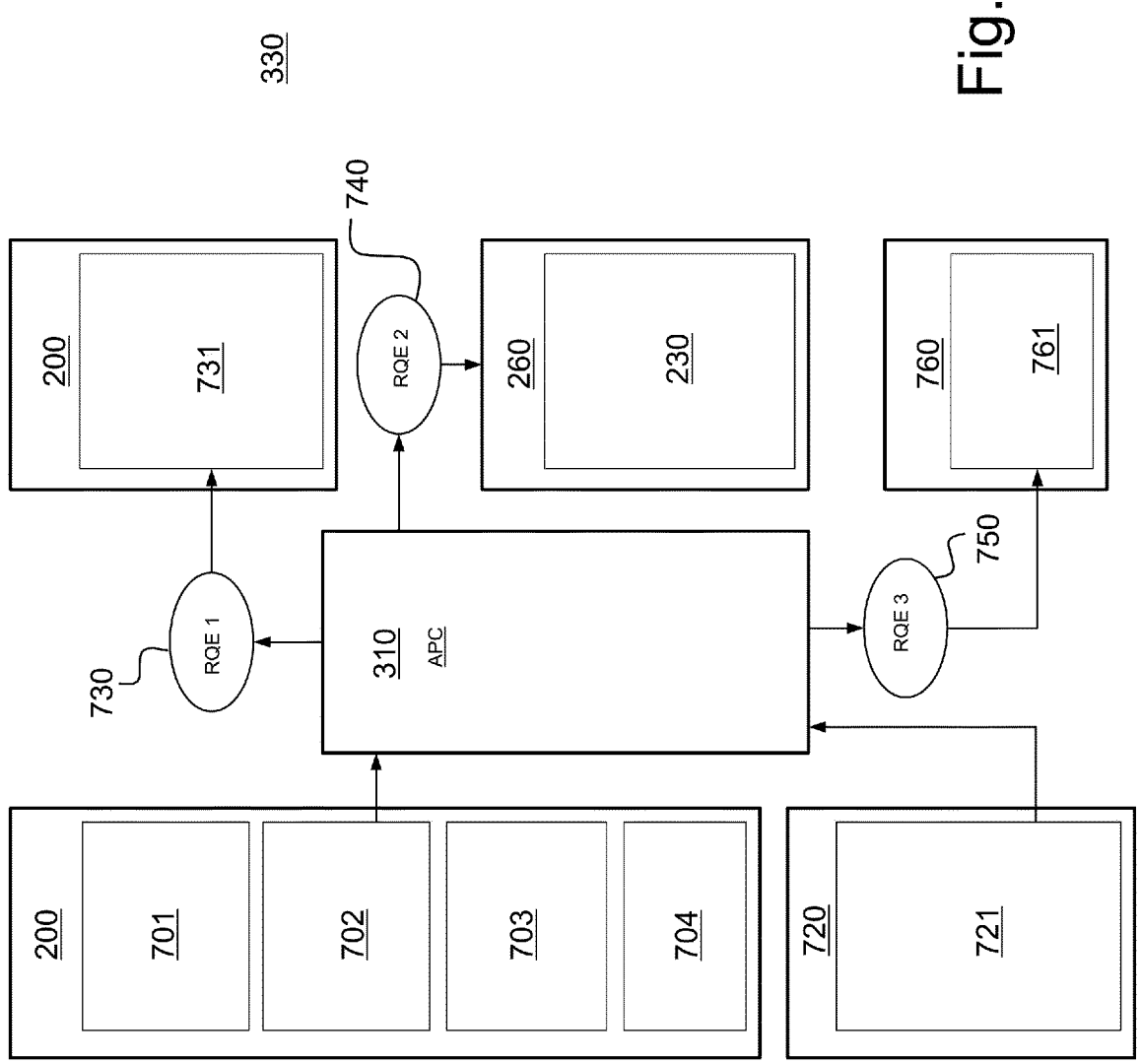

METHOD AND SYSTEM FOR CONTROLLING SOOT MAKE IN SYNTHESIS GAS PRODUCTION

FIELD OF THE INVENTION

The present disclosure relates to a gasification system and process for the production of synthesis gas by partial combustion of a carbonaceous feed.

The disclosure is directed to a system and method to control syngas characteristics and/or the production of gasification byproducts, such as soot.

BACKGROUND OF THE INVENTION

The carbonaceous feedstock can for instance comprise biomass, (heavy) oil, crude oil residue, bio-oil, hydrocarbon gas or any other type of organic material or mixture thereof.

A liquid carbonaceous feed can for instance comprise (heavy) oil, crude oil residue, bio-oil or any other type of liquid organic material or mixture thereof. The liquid carbonaceous feed may, for instance, comprise a stream from a refinery. The heavy residue hydrocarbon stream may result from the processing of crude oil to obtain specific products, such as gasoline, diesel, kerosene, bitumen and bunker fuel, i.e., light refinery products. The residue hydrocarbon stream herein typically includes what is left of the crude oil when products as mentioned above have been removed after various refining separation steps. In principle, any refinery hydrocarbon stream can be fed to a gasification system to produce syngas. In general, the carbonaceous feedstock may comprise the bottom stream of various refinery separation processes, such as distillation, vacuum distillation or extraction columns. Those bottom streams may have denominations such as Short Residue, Vacuum Residue, Vacuum Flashed Cracked Residue, High Sulfur Fuel Oil, Asphaltenes.

Converting light refinery products into syngas is typically not economic and therefore not done. The economic benefit appears when a refinery converts heavy hydrocarbon streams, that cannot be further converted into light(er) refinery products, into syngas. Those heavy hydrocarbon streams typically have relatively low value, but can contribute to refinery margin when converted into syngas or hydrogen.

A process for the partial oxidation of a liquid, hydrocarbon-containing fuel, as described in WO9532148A1, can be used with the gasifiers of the type shown in the patents referenced below.

A burner, such as disclosed in U.S. Pat. Nos. 9,032,623, 4,443,230 and 4,491,456, can be used with gasifiers of the type shown in the previously referred to patent to introduce liquid hydrocarbon containing fuel, together with oxygen and potentially also a moderator gas, downwardly or laterally into the reaction chamber of the gasifier.

Partial oxidation gasifiers of the type shown in, for instance, U.S. Pat. Nos. 4,828,578 and 5,464,592, include a high temperature reaction chamber surrounded by one or more layers of insulating and refractory material, such as fire clay brick, also referred to as refractory brick or refractory lining, and encased by an outer steel shell or vessel. Variations of such gasification reactors include those that are provided with a cooling jacket in which water circulates as cooling medium. The purpose of the refractory or the cooling jacket is to avoid loss of primary containment.

The hot syngas produced in partial oxidation gasifiers exits at temperatures, typically in the range of 1000° C. to 1400° C. The hot syngas is cooled down in a cooling section. The cooling section may comprise one or more special shell and tube heat exchangers denominated Syngas Effluent Cooler (SEC) or Waste Heat Exchanger (WHE). In the heat exchanger, hot syngas travels through the pipes and water is boiled outside the heat exchanger tubes producing steam. The velocity at which syngas travels through the pipes is significant. The presence of ash particles in the syngas means that the pipes in the heat exchanger can suffer from erosion or fouling.

A minimum amount of soot in the syngas is required to reduce the impact of the ash particles on the heat exchanger pipes. Uncontrolled soot make resulting in non-controlled soot-to-ash ratios may lead to shorter than expected operating lifetime of the SEC or WHE.

Variants to the syngas cooling by heat exchanger include the use of a water quench section.

In addition to controlling the characteristics of the produced syngas, it is also of economic interest to control the production of byproducts. Soot is a byproduct that is typically produced in an amount of, for instance, around 0.5% to 2% weight on feed (w.o.f). The amount of soot make can change due to changes in operating conditions such as feed characteristics, feed temperature, oxygen to feed ratios, steam to oil ratios, among others. The soot make should be in principle minimized as higher soot make increases operating expenditure (OPEX). However, as mentioned before, some soot is needed to protect the inner surfaces of the heat exchangers for cooling the syngas.

Conventionally, operators of gasification systems use manual sampling to take slurry samples for monitoring the Total Suspended Solids (TSS) and Soot-to-ash (S/A ratio) or Carbon-to-ash (C/A) ratio. Such sampling is non-regular, and it requires hours or days to get a value because the analysis of the sample is done in a laboratory. The off-line sampling, using samples checked at a location remote from the actual gasification process, thus introduces an inherent delay.

Thus, the TSS value can be used to make operational adjustments to the operating unit, but with a significant delay. This delay may not be problem for operating units running well below their limits, but it becomes an issue when trying to maximize the availability of the operating unit, increasing its processing capacity, or when the composition of the available feedstock changes relatively often. Relatively often may imply, for instance, per day, depending on spot prices of available crude oil.

The soot make is typically inversely proportional to the severity of the gasification operation. An additional parameter used to monitor the severity of the gasification operation is methane slip in the syngas, which is inversely proportional to the severity of the gasification operation.

Online monitoring of the amount of CH4 slip in the syngas combined with periodical off-line checking of samples to monitor the Total Suspended Solids (TSS) and Carbon-to-Ash ratio (C/A ratio) of the produced syngas, potentially combined with off-line checking of feedstock viscosity, would be generally sufficient to operate the gasification system within a predetermined design window for systems that are operating well within their design limits.

Some of the inconveniences with the conventional monitoring approach are that the adjustments to the operation of the gasification process may be delayed due to data availability (obtaining the TSS result from the lab based on samples introduces an inherent delay) as well as operator handling. As a result, control of the gasification process is not fast enough to account for the impact of changes in feedstock type.

Due to the delay, the approach using off-line checking of samples may not be suitable to process the residue stream when the operating unit is running close to its design limits and/or when the composition of the available feedstock changes relatively often.

BRIEF DESCRIPTION OF THE INVENTION

The present disclosure aims to control soot make more precisely to allow reliable operation even when close to design limits.

The disclosure provides a system for the gasification of a carbonaceous feedstock, the system comprising:
  a gasifier for partially oxidizing the carbonaceous feedstock to produce syngas;
  a cooling section connected to an outlet of the gasifier, the cooling section being adapted to cool the syngas to provide cooled syngas;
  a soot removal unit for removing solids from the cooled syngas, the soot removal unit being adapted to provide a cleaned syngas stream and a waste slurry stream comprising the solids;
  a TSS sensor adapted to substantially continuously monitor a concentration of total suspended solids (TSS) in the waste slurry stream; and
  a control system being adapted to substantially continuously optimize the oxidizing process in the gasifier in response to changes in the concentration of total suspended solids in the waste slurry stream.

The system of the disclosure significantly reduces or may entirely obviate a delay in feedback of the TSS measurement, enabling substantially instant operator action in response to changes in the concentration of the number of suspended solids removed from the syngas and/or automatic adjustment of one or more parameters controlling the gasification process. The substantially instant response to changes also allows the system to respond more quickly to changes in composition of the feedstock, greatly increasing the flexibility of the gasification process to handle different feedstocks, or at least differences in the feedstock. In turn, this greatly increases the feedstock flexibility of a refinery overall, allowing the refinery to take in a wider range of crudes as available on the spot market. The disclosure allows for a responsive feedback loop and enables integrated control of the gasification process within an Advanced Process Control scheme if desirable.

In an embodiment, the carbonaceous feedstock comprises a liquid carbonaceous feedstock, a gaseous carbonaceous feedstock or a mixture thereof.

In another embodiment, the control system comprises a basic process control system for controlling operation of, at least, the gasifier, the basic control system being adapted to adjust operation of the gasifier in response to changes in operating parameters, comprising at least the concentration of total suspended solids.

In yet another embodiment, the control system comprises an advanced process control system being adapted to adjust at least one setpoint of the basic process control system in response to changes in the concentration of total suspended solids.

In an embodiment, the system comprises a viscosity sensor adapted for inline measurement of the viscosity of the carbonaceous feed.

The viscosity sensor may provide input to a separate control loop as part of Basic Process Control for adjusting feed temperature that in turn has an impact on feed viscosity that also has impact on the amount of soot make. Alternatively, the viscosity measurement can be supplied to the Advanced Process Control system.

In another embodiment, the control system is adapted to substantially and continuously optimize operation of the gasifier in response to changes in the viscosity of the carbonaceous feed. For instance, the viscosity sensor could provide input to a separate control loop for adjusting feedstock temperature.

In yet another embodiment, the TSS sensor comprises a laser-based probe element, or an ultrasonic sensor or a laser diffraction-based sensor, or a turbidimetry sensor capable of quantifying changes in the solids concentration in the soot slurry. The TSS sensor can also provide information about the particle size distribution of the suspended solids in the slurry which can then be further analyzed for potentially estimating changes in soot to ash or carbon to ash ratios.

According to another aspect, the disclosure provides a process for the gasification of a carbonaceous feedstock, the process comprising the steps of:
  partially oxidizing the carbonaceous feedstock in a gasifier to produce syngas;
  guiding the syngas from an outlet of the gasifier to a cooling section;
  cooling the syngas in the cooling section to provide cooled syngas;
  providing the cooled syngas to a soot removal unit;
  using the soot removal unit to remove solids from the cooled syngas, the soot removal unit providing a cleaned syngas stream and a waste slurry stream comprising the solids removed from the syngas;
  substantially continuously monitoring a concentration of total suspended solids (TSS) in the waste slurry stream;
  providing the concentration of total suspended solids (TSS) to a control system; and
  the control system substantially continuously optimizing the step of partially oxidizing the carbonaceous feedstock in response to changes in the concentration of total suspended solids.

The process enables precise control of soot make in a gasification process for the gasification of a carbonaceous feedstock, that can be applied to diverse gasification designs such as for example the Texaco design, and Shell water quench design, among others.

In an embodiment, the control system comprises a basic process control system for controlling operation of, at least, the gasifier, the basic process control system being adapted to adjust operation of the gasifier in response to changes in operating parameters, comprising at least the concentration of total suspended solids.

In another embodiment, the control system comprising an advanced process control system being adapted to adjust at least one setpoint of the basic process control system in response to changes in the concentration of total suspended solids.

The step of the control system substantially continuously optimizing the step of partially oxidizing the carbonaceous feedstock may comprise the step of substantially continuously adjusting operation of the gasifier to maintain the concentration of total suspended solids (TSS) in the waste slurry stream within a predetermined range.

In another embodiment, the process comprises the steps of:

substantially continuously measuring the viscosity of the carbonaceous feedstock;
providing the measured viscosity to the control system; and
changing the output signal of a control block of the control system after comparing the measured viscosity against a desired setpoint.

The output signal can be connected to the set point of the feedstock temperature control block, such that control is on cascade and/or the output signal can be connected to the set point of the methane slip control block also in cascade.

In an embodiment, the process comprises the step of:
determining a carbon-to-ash ratio (C/A ratio) of the solids in the waste soot slurry;
providing the carbon-to-ash ratio to the control system; and
the control system optimizing the gasification process in response to changes in the carbon-to-ash ratio of the solids in the waste slurry.

The step of providing the concentration of total suspended solids (TSS) to the control system may comprise:
measuring the solids to provide measured suspended solids;
analyzing the measured suspended solids in the waste slurry stream to provide a particle count;
providing the particle count per size bin to a processing unit which uses a mathematical correlation to translate the particle count per size bin into a total suspended solids value; and
sending the total suspended solids value to the control system.

The step of the control system substantially continuously optimizing the gasification process in response to changes in the concentration of total suspended solids may comprise:
feeding the concentration of total suspended solids as an input to at least one control block in the control system;
the at least one control block providing an output signal; and
adjusting one or more final elements (such as control valves) of the gasification process based on the output signal of the at least one control block, or using the output signal as input for one or more other control blocks within the control system.

Thus, the control system can control valves or other components to influence the gasification process, such as an oxygen flow control valve, a feedstock flow control valve (controlling the load or feedstock throughput), feedstock temperature, etc.

The process of the disclosure can be applied in a basic or in an Advanced Process Control scheme that could adjust a number of variables to maintain the gasifier unit and the produced syngas within a predetermined operating window.

BRIEF DESCRIPTION OF THE DRAWINGS

These and other features, aspects, and advantages of the present disclosure will be apparent from the following detailed description with reference to the accompanying drawings in which like characters represent like parts throughout the drawings. In the drawings:

FIG. 7 shows a diagram of an embodiment of a control system for a gasification process according to the present disclosure.

DETAILED DESCRIPTION OF THE INVENTION

Figure 1:
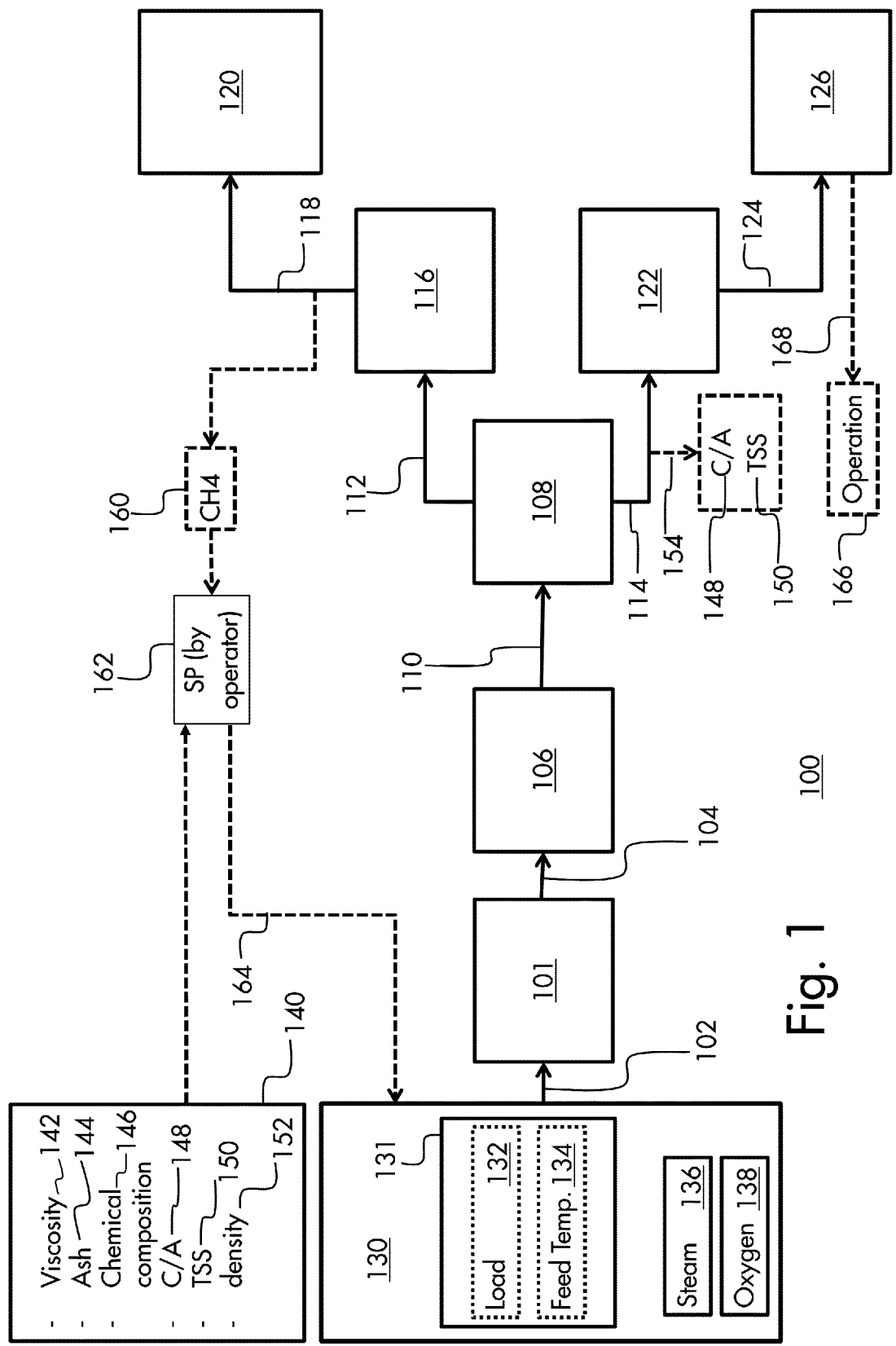
FIG. 1 shows an exemplary diagram of a conventional gasification system.

The present disclosure is directed to a method for controlling soot make in synthesis gas production by partial oxidation. In a preferred embodiment, the carbonaceous feed comprises, at least, a residue stream resulting from the refining of crude oil. Gasification is the partial oxidation of the feedstock to produce syngas.

Syngas, or synthesis gas, as used herein is a gas mixture comprising at least hydrogen and carbon monoxide, and typically some carbon dioxide. The (treated) syngas can be used, for instance, as a fuel. Also, the syngas may be an intermediary product for downstream processes for creating or producing, for instance, synthetic natural gas (SNG), ammonia, methanol, hydrogen, waxes, synthetic hydrocarbon fuels or oil products. Thus, the syngas may be used as a feedstock for these and other chemical processes.

Hereinafter, similar features are indicated using the same reference numerals.

FIG. 1 shows a gasification system 100, comprising a gasifier 101 for partially oxidizing a feedstock 131 to produce syngas 104. The system typically comprises a cooling section 106 for cooling the syngas below a predetermined threshold temperature, to make the syngas suitable for further processing.

The gasifier herein typically comprises a reactor provided with one or more burners (not shown). The gasifier feed streams 102, typically include a carbonaceous feed 131, oxygen 138 and optionally steam 136. The feedstream can be provided to the one or more burners of the gasification reactor. Steam can be optionally replaced or mixed with another gas functioning as moderator gas. In the gasification reactor, the feedstreams 102 undergo partial oxidation to provide syngas 104. The syngas 104 is subsequently cooled in the cooling section, to provide cooled syngas 110. The cooling section 106 comprises, for instance, heat exchangers to reduce the temperature of the syngas close to its dewpoint.

Downstream of the cooling section 106, the system comprises of a soot removal unit 108. The soot removal unit may be provided with a quench section (not shown) to cool down the syngas and capture the soot particles in the form of a slurry 114. Herein, the cooled syngas 110 is contacted with a liquid, typically a water bath or spray. The quench section reduces the temperature of the already cooled syngas 110, while also capturing the solids in the cooled syngas in the liquid.

The gaseous syngas 112 disengages from liquid slurry 114 in the soot removal unit. The slurry 114 contains solid contaminants and impurities, removed from the cooled syngas. The soot removal unit typically has an outlet for cleaned syngas 112 and another outlet for the soot slurry 114 containing solids. The solids typically comprise ash and residual carbon (i.e. carbon which was not oxidized in the gasifier).

The solids are comprised in the slurry 114. The waste slurry 114 herein comprises a suspension of the solids removed from the syngas suspended in a fluid, typically water.

In a practical embodiment, the slurry 114 from the soot removal unit 108 may initially be at the process pressure, for instance in the range of 20 to 80 barg. The slurry typically passes through a control expansion valve (not shown), which reduces the pressure of the slurry, for instance to around 1 to 10 barg. Therefore, slurry stream 114 may include a high pressure section and a low pressure section.

Downstream of the soot removal unit 108, the system may comprise a scrubbing unit 116 to remove gaseous impurities and some residual soot from the syngas 112 and provide cleaned synthesis gas 118. The gaseous impurities may include ammonia and others.

The system 100 may comprise downstream process facilities, to process the cleaned synthesis gas 118. Downstream process units 120 may comprise, for instance, one or a series of water gas shift reactors to change the composition of the syngas 118. A selection of potential downstream processes is described in more detail below.

The system may comprise other downstream units. For instance, the system 100 typically comprises a slurry handling unit 122 for processing the soot slurry 114 by separating the soot from the slurry. Note that in a practical embodiment, the slurry handling system may be designed to process the low pressure section of the slurry stream 114.

The slurry handling system may, for instance, comprise a soot filtration system to filter the soot slurry 114 to provide a filtrate (typically filtered water) and a filter cake 124 comprising the soot removed from the syngas. The produced filtrate stream (not shown) may be recycled back for quenching of the syngas in unit 108.

In a practical embodiment, the slurry handling unit 122 may receive slurry from one or more soot removal units 108. In other words, waste slurry 114 originating from multiple upstream gasification sections (including gasifier 101, cooling section 106 and soot removal unit 108) may be combined to be handled by a single downstream waste handling section (including, for instance, slurry handling unit 122 and soot filter unit 126). The slurry streams 114 can merge and then the combined slurry mixture can be analyzed for TSS so that the operating parameters of the slurry handling unit 122 can be adjusted accordingly.

The filter cake 124 can be provided to a disposal unit 126. The disposal unit 126 may, for instance, dispose of the filter cake potentially in combination with processing of the filter cake 124, to remove soot and ash therefrom and prepare it for proper disposal in line with, for instance, regulation, potential for further use, etc. The removed solids may be sent to a Furnace Processing Unit (not shown) for incineration and ash production.

A control system 130 controls operation of, at least, the gasifier 101. The control system 130 controls parameters of the gasification process. The parameters may include one or more of: Load 132, feedstock temperature 134, steam flow 136, oxygen flow 138.

An operator may, in addition, use one or more of the following parameters 140 as input to adjust operation of the control system 130: Feedstock viscosity 142, ash content 144, chemical composition 146 of the feedstock, carbon-to-ash ration 148, total suspended solids 150, density 152 of the feedstock. The parameters 140 are typically obtained using offline sampling of the feedstock or any of the process streams in the process 100.

The gasifier 101 is set for a predetermined operating window. A stable operating window that would maintain a relatively constant soot-to-ash or carbon-to-ash ratio in an oil gasification unit may be disrupted by changes to one or more of the following parameters:

feed load 132 (typically the supply rate of the feedstock 131; the supply rate may be expressed in metric tonne per day (or m3/sec));

feed density 152; this may be expressed in kg/m3;

feed viscosity 142 (for instance expressed in Pa·s=(N·s)/m2=kg/(s·m));

ash content 144 of the feedstock (for instance expressed in mol ash per mol feedstock, mol/m3, m3/m3, or as a percentage with respect to the total volume of the feedstock, or in weight percentage with respect to a unit of weight of feedstock);

other feed properties, such as chemical composition 146, which impact heating value of the feedstock;

Flow rate of moderator gas 136 to the gasifier. Fluctuations in moderator gas, typically steam, to the gasifier may derive from the steam flow control system or steam supply.

Flow rate of oxygen comprising gas 138 to the gasifier. Fluctuations in oxygen flow to the gasifier may result from the operator control or from an oxygen supply pressure.

In the system of FIG. 1, TSS 150 and/or the C/A ratio 148 may be determined by taking samples 154 from the soot slurry 114. The respective amounts may be determined offline, for instance by testing in a laboratory. Operation parameters of the soot removal processing facilities 108 may be determined by taking samples 154 from the removed soot and/or ash handling.

The load 132 can be monitored continuously. For instance using a flow meter in a supply pipeline leading the feedstock 131, typically a liquid oil residue feed, to the gasifier 101.

Another parameter is an amount of $CH_4$ 160 in the syngas 118. The amount may, for instance, be expressed in percentage per unit of volume, or in mol $CH_4$ per mol syngas. The amount of $CH_4$ 160 may also be referred to as $CH_4$ slip, i.e. the amount of $CH_4$ which has slipped through the respective process steps.

Another parameter is the oxygen to feed ratio which is calculated from the flow of oxygen fed to the gasifier divided by the flow of hydrocarbon feed which could be oil and/or natural gas.

Operation parameters 166 of the soot treatment process 126 may be determined by taking samples 168 from the removed soot and/or ash handling, and determining the respective amounts offline.

Combined parameter values of C/A ratio 148, TSS 150, methane content 160 in the syngas 118 and/or operation parameters 140 are provided to an operator 162. Based on the provided values, in combination with the amount of methane 160 in the syngas, the operator 162, i.e. a person, can adjust a control signal 164, to adjust one or more setpoints of the control system 130. In response, the control system 130 adjusts operation parameters of the inlet streams fed to gasifier 101 and/or of any of the other process units of the system 100 in accordance with the adjusted setpoints.

Control of the gasification process using the parameters is described in more detail in, for instance, the book "Gasification" by Chris Higman and Maarten van der Burgt, Elsevier 2003, ISBN 0-7506-7707-4. For instance, the methane content 160 in the syngas may provide an indication of the temperature regime inside the gasifier 101 and thus can be used to adjust said temperature regime to a predetermined optimum.

Soot make can increase when a gasification unit processes a feed stream 102 above their original design levels. This may happen for example after a revamp. Soot make can also increase when the ash content in the feed stream 102 changes, for instance due to changes in upstream processes and/or changes in the processing of certain types of crudes purchased by the refinery complex. Also, the soot make can increase when the operator tries to maintain a soot-to-ash ratio of about 4, aiming at protecting the surfaces of the Syngas Effluent Cooler.

In those situations, the filtration unit and/or the furnace unit in the soot and ash removal section 126 may be running at or close to their design limits. In such scenario, precise control of the soot make is needed to maintain the operability of the slurry processing unit 126, for instance the filtration and furnace units thereof.

Conventional oil gasification systems may produce synthesis gas with a hydrogen to carbon monoxide ratio of around 2. Such hydrogen to carbon monoxide ratio can be optimized to maximize production of the product downstream of the gasification system. For example, if the produced synthesis gas is used for supplying hydrogen to a refinery complex, then the hydrogen to carbon monoxide ratio can be adjusted towards a maximum value. If the produced syngas is supplied to a methanol production system downstream of section 120, the molecular ratio to be adjusted is Hydrogen minus Carbon Dioxide over Carbon Monoxide plus Carbon Dioxide. The latter may be around 2. In case the syngas is supplied to an ammonia production facility, which is another exemplary process which may be included in downstream section 120, then the Carbon Dioxide may be minimized.

Because the soot-to-ash ratio 148 may have a significant impact on the operating lifetime of components of the cooling section 106, such as the heat exchangers cooling the syngas (SEC or WHE), the soot-to-ash ratio 148 is monitored. For instance, the soot-to-ash ratio 148 is monitored by regularly sampling slurry 114 produced after quenching of the syngas. Conventionally, this is done by manual sampling. Slurry samples are used to determine the Total Suspended Solids (TSS) and Soot-to-ash (S/A ratio) or Carbon-to-ash (C/A ratio). Such sampling is non-regular, and it typically requires a long time, hours or even days, to be converted into a value because the analysis of the sample is done in a laboratory. Thus, the TSS value which is used to make corrective operational adjustments to the operating unit is obtained with a significant delay. This is not a big issue for operating units running well below their limits or having spare soot processing capacity, but it becomes an issue when operating the gasification process close to or at the design limits.

The business drivers for applying a basic process control scheme or an advanced process control scheme are a desired syngas composition and/or an optimal soot make. The characteristics or composition of the produced syngas in a gasification unit can be optimized or adjusted to maximize the valuable product to be produced with the syngas. The soot or carbon make has to be such that soot (or carbon) to ash ratio is around a target value.

Conventional control systems in gasification systems are relatively simple and mainly aim at avoiding temperature excursions in the gasification reactor. Hence, these conventional control systems are mainly focused on safety and not on product or margin.

Figure 2:
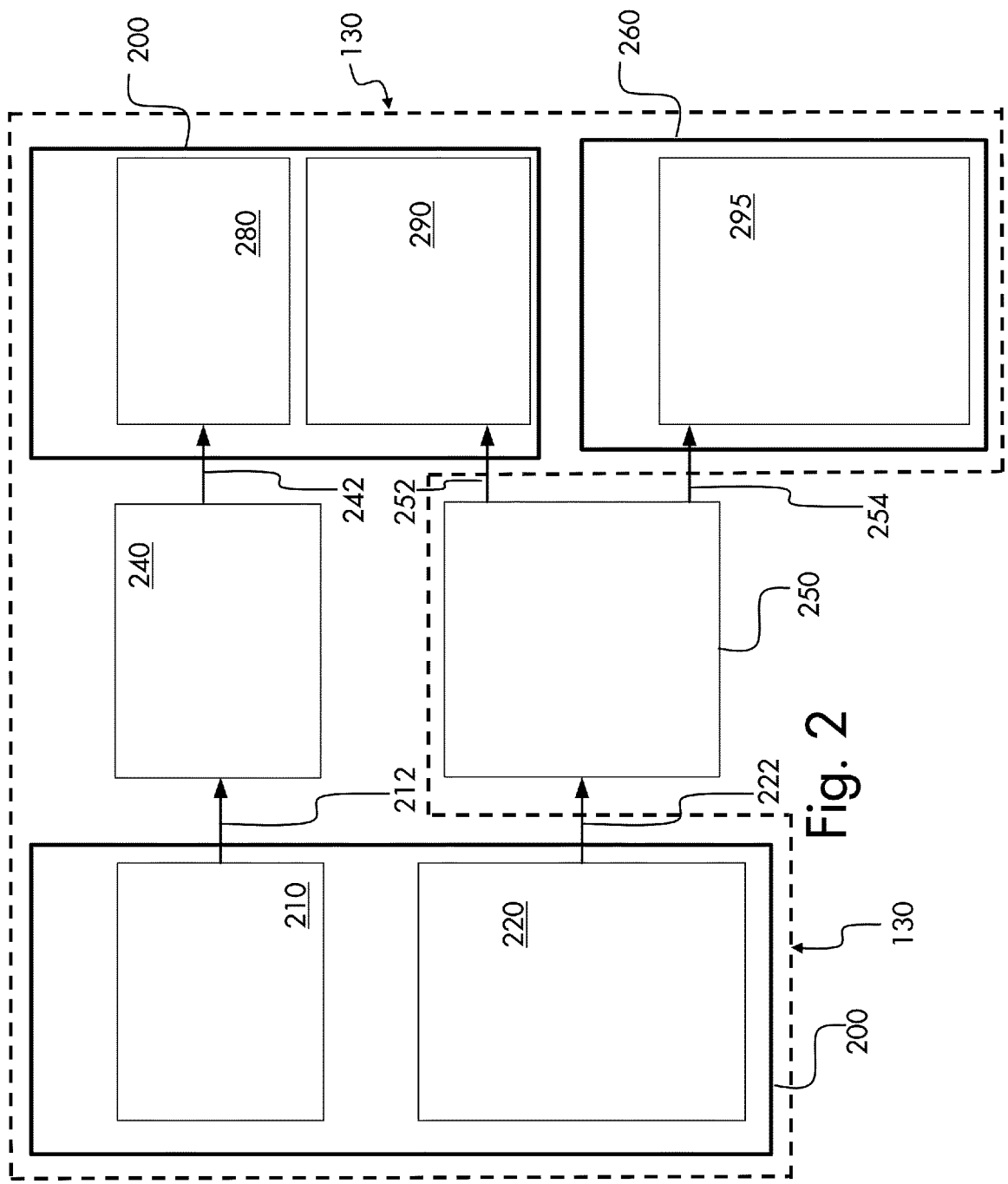
FIG. 2 shows a diagram of a conventional control system for a gasification process.

An example of a conventional control system 130 is shown in FIG. 2. Herein, the process control system may comprise a number of interconnected process control units, such as:

Gasifier control unit 200, also referred to as Distributed Control System 1 (DCS-1). The gasifier control unit 200 controls operation of the gasifier 101. The gasifier control unit 200 has automated control inputs 210, including, for instance, one or more of feedstock flow rate or load 132, oxygen flow rate 138, methane slip 160, and methane slip setpoint 164. The gasifier control unit 200 also has manual control inputs 220, including, for instance, one or more of feedstock flow rate or load 132, feedstock temperature 134, steam flow 136, reactor temperature, oxygen flow rate 138, methane slip 160, methane slip setpoint 164, quench water flow rate, and TSS 150;

Central Process Control Unit 240. The central process control unit 240 receives an automated control output signal 212 supplied by the gasifier control unit 200 in response to the automated control inputs 210. In response, the central process control unit 240 generates an automated control signal 242 to automatically control operation of the gasifier control unit 200. Automatically controlled may be, for instance, the feedstock flow rate or load 132 and/or the oxygen flow rate 138;

Operator control 250. The operator control section 250 basically indicates operator control as executed by a person, the so-called operator, who responds to a control output signal 222 provided by the gasifier control unit 200. The control output signal 222 may comprise one or more parameters that the operator receives and judges to adjust the operation variables 220. The operator control action 250 may provide and/or adjust a setpoint input to the gasifier control through signal 252 to adjust the variables controlled by the DCS of the gasifier control system 200. Similarly, parameters under operator control 250 can be adjusted by providing a setpoint to the DCS that controls the Soot Ash Removal Unit (SARU) through input 254 that adjusts setpoints in the control system 295 for controlling operating variables of the soot ash recovery unit. The gasifier control variables that can be subjected to operator adjustments 290 may include one or more of feedstock flow rate 132, oxygen flow rate 138, steam flow rate, and quench water flow rate;

Control system of the Soot Ash recovery unit 260, also referred to as Distributed Control System 3 (DCS-3). The soot removal control unit 260 may respond to the setpoints entered by operator action 254. The adjustable variables 295 may include one or more of soot slurry flow rate, rotating speed of furnace, combustion air to furnace, fuel to furnace (the latter variables relating to the soot/ash removal unit 126).

In FIG. 2, signals 212 and 222 are indications from the DCS-1 200, such as process values. The operator is typically able to read these indications. Signals 242 and 254 represent output variables and/or setpoints. The operator 250 or the control system 240 may set or adjust one or more of these output variables and/or setpoints into the DCS-1 200 or DCS-3 260 to adjust the respective process control variables.

The general description of the conventional control scheme 130 presented in FIGS. 1 and 2 and explained above clearly indicates the important role of the (human) operator, i.e. the operator control or intervention indicated by operator control block 250.

Some of the inconveniences with the control scheme that follows a conventional approach are that the adjustments to the operation of the gasification process may be delayed due to data availability (such as the TSS result from the lab) as well as operator handling. Due to the delay, the approach using off-line checking of samples may not be suitable to process the residue stream when the operating unit is running close to its design limits and/or not able to track the impact of fast changes in oil feed type and/or quality.

While the process control scheme 130 shown in FIG. 2 suffices the requirements for a safe and profitable operation, it may typically not maximize the economic benefit of the gasification system since the changes implemented by the operator are generally delayed. Furthermore, as the operating window narrows because of operation close to the design limits of the gasification and soot ash recovery units, it becomes more important to have a stable operation. For example, if a unit is producing soot make at the limit of its processing capacity and the soot make fluctuates in a large window then excess soot make could cripple operation of the soot slurry processing units, i.e., Filtration and Furnace.

In addition, depending on the use of the produced syngas, having a target syngas composition to maximize final product may be desirable because of increased margin.

In such scenarios, having an expanded control system or an advanced process control system according to the present disclosure will make those possible. Such extended Process Control System or Advanced Process Control System could have input and output variables as shown in, for instance, FIGS. 3 and 7. These are described in more detail below.

The term Total Suspended Solids (TSS) used herein refers to the total number of solid particles suspended in the soot slurry. The solids comprise a combination of carbon and ash compounds that are not water-soluble. TSS concentration is the concentration of TSS (in the slurry) per unit of volume (of the slurry).

The carbon-to-ash ratio (C/A ratio) as used in the present disclosure relates to the ratio between the carbon based molecules in the soot versus the ash. Ash herein relates to (non-soluble) non-carbon based molecules, such as metal oxides, sulfides and minerals. Soot relates to the combination of carbon based molecules and ash.

For a liquid hydrocarbon comprising feedstock, the non-catalytic partial oxidation of hydrocarbons may take place in a refractory-lined reactor. The syngas 104 is cooled in the syngas effluent cooler 106, which is directly connected to the reactor. The effluent cooler 106 produces high-pressure saturated steam, which can be used to recover at least part of the waste heat lost by cooling. The soot in the syngas 104 is removed when it passes through the separator or soot removal unit 108 and the scrubber 116.

The cleaned synthesis gas 118 can be further processed in the downstream process path 120, for instance to convert the syngas into a selected hydrocarbon product and/or for the production of $H_2$. The downstream process path 120 may contain, for instance, one or a series of Water Gas Shift reactors to change the composition of the syngas.

Examples of the conversion of syngas into final products are given in the reactions below. The water gas shift reaction, which provides a source of hydrogen (H2) at the expense of carbon monoxide (CO):

$$H2O + CO \rightarrow H2 + CO2$$

The Fischer-Tropsch process can produce, for instance, alkanes as follows:

$$(2n+1)H2 + nCO \rightarrow CnH(2n+2) + nH2O$$

where n is typically in the range of 10 to 20. The formation of methane (n=1) is unwanted. Most of the alkanes produced tend to be straight-chain, suitable as diesel fuel. In addition to alkane formation, competing reactions may provide alkenes, as well as alcohols and other oxygenated hydrocarbons.

The present disclosure provides an improved system 300 for the gasification of a hydrocarbon based feedstock 131 in combination with oxygen 138 and a moderator, i.e., steam 136. The system 300 comprises an automated feedback loop to automatically control and adjust the operation of the gasifier 101, keeping the conditions within predetermined margins.

In a preferred embodiment, the system 300 may comprise an Advanced Process Control (APC) unit 310. The APC unit 310 is connected to basic control system 330. The APC unit 310 may receive an input signal 312, comprising one or more process variables, from the basic control system 330. In response, the APC unit 310 may provide APC input signal 314 to the control system 330, to adjust one or more setpoints used by various components of the control system 330. Thus, the APC unit 310 may effectively and automatically adjust the control of the gasification process based on changes in one or more of the variables.

For example, information about the inlet streams to the gasifier 101 (such as, for instance, feedstock properties 316, load 132, ash content 144, oxygen flow rate 138, steam flow rate 136), soot characteristics 320, and syngas composition 340. The syngas composition 340 may comprise a number of variables 350, including one or more of methane slip, hydrogen content, CO content, and/or $CO_2$ content.

One or more feedstock characterization sensors 360 may be provided for measuring respective feedstock properties, i.e. properties of the feedstock feed stream 131 to the gasifier 101. For instance, a sensor 360 may measure the viscosity 142 of the feedstock 131 online, i.e. directly, in real-time.

Soot characteristics input 320 is provided by soot measuring device 370. The soot measuring device 370 may obtain signal 372 from a sensor element installed in, or connected to, the waste slurry stream 114. The sensor may be installed in the high pressure section and/or the low pressure section of the waste slurry stream 114. The sensor element may determine the TSS concentration 374 and/or the C/A ratio 376. The soot measuring device 370 may automatically and substantially continuously determine the TSS concentration 374 and/or the C/A ratio 376.

The APC input line 312 connects one or more parameters from the DCS to the APC. Said parameters may relate to the gasifier feed streams 102, such as load 132, viscosity 142, ash content 144, and other feedstock properties 316. The soot characteristics input line 320 provides the C/A ratio 376 and/or the total suspended solids (TSS) 374 concentration in the waste slurry stream 114 to the control system 330. The control system may transfer part or all of the input 320 to the APC system 310 via signal 312. The syngas analysis input line 380 provides the syngas composition 350 of the cooled and cleaned syngas 118 to the control system 330. The control system 330 may share part or all of the input 380 with the APC system 310 via signal 312.

Figure 3:
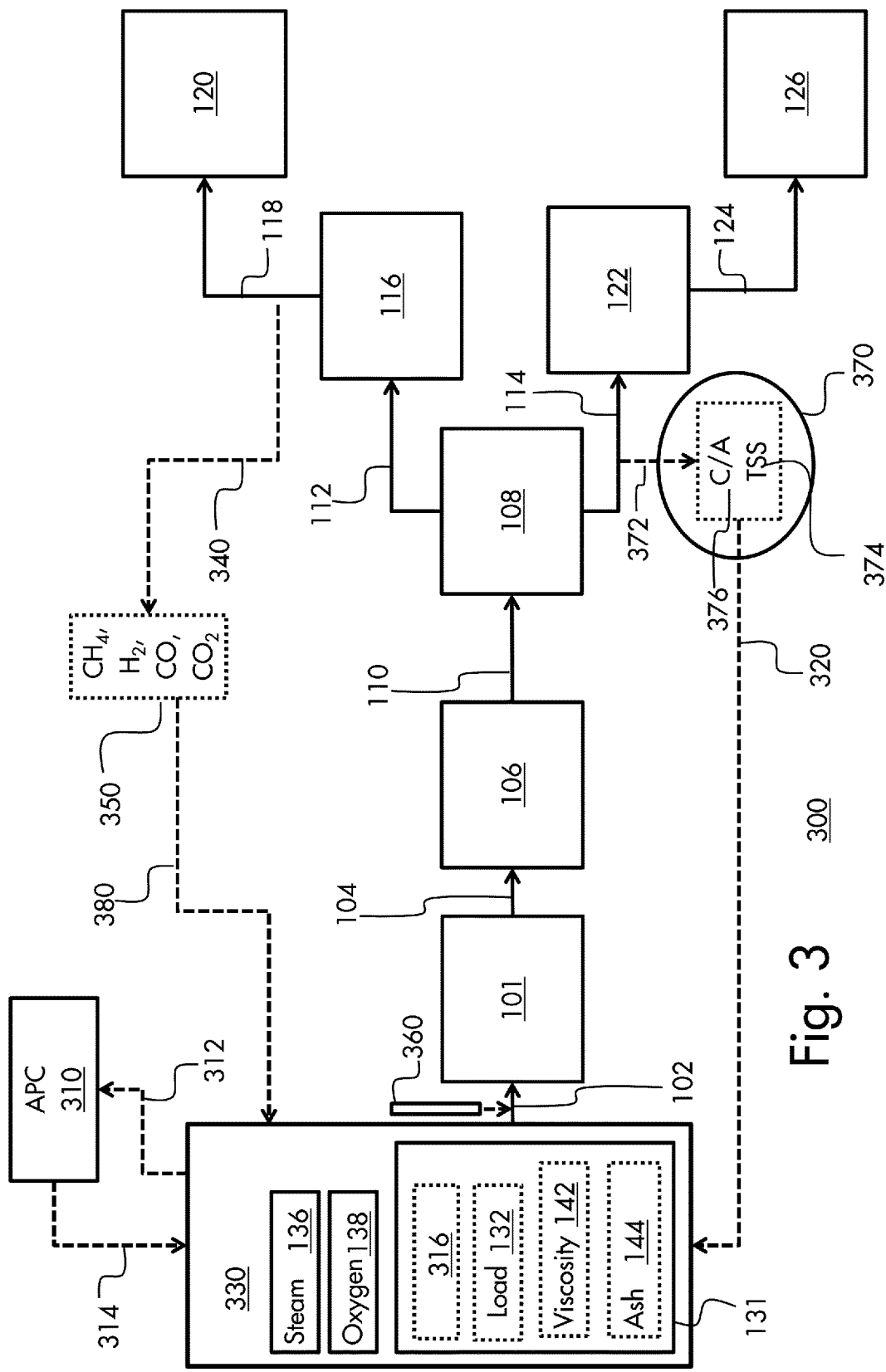
FIG. 3 shows a diagram of an embodiment of a gasification system of the present disclosure.
Figure 4:
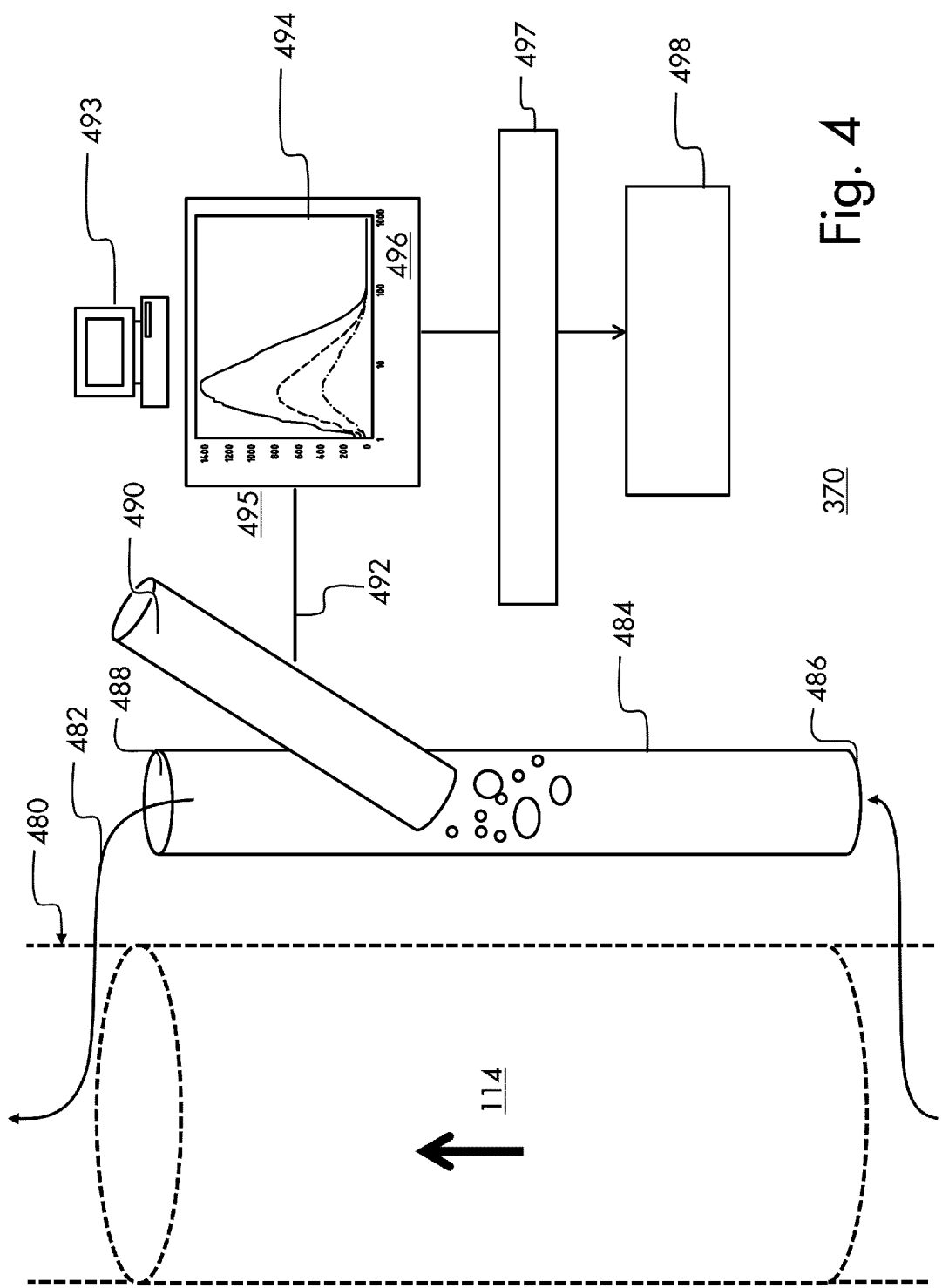
FIG. 4 shows a diagrammatic representation of an embodiment of a TSS measurement device of the disclosure.

FIG. 4 shows an exemplary embodiment of the soot characterization device 370. The waste slurry stream 114 is, for instance, flows through a pipeline 480 connecting the soot removal unit 108 to the slurry handling unit 122 (see FIG. 3). This pipeline may include a high pressure section and a low-pressure section. A fraction 482 of the slurry stream 114 is diverted to a measuring tube 484. The fraction 482 may be guided back to the low pressure side of the main pipeline 480 at the end of the bypass tube 484. The measuring tube 484 may be provided with inlet flange 486 and outlet flange 488, each having a predetermined opening to control the fluid flow through the bypass tube 484.

In a preferred embodiment, the fluid flow rate through the bypass tube 484 is substantially constant. The constant fluid flow rate may be achieved, for instance, by the predetermined opening of the inlet flange 386 and/or outlet flange 388 and/or a substantially constant pressure in the gasifier 101.

Alternatively, the pipeline 480 and/or the soot removal unit 108 may be provided with a suitable device to determine the flow rate of the slurry stream 114, which in combination with the known inlet and outlet opening of the bypass tube 484 will allow determining the flow rate through the bypass tube 484. Alternatively, a flow measurement device can also be directly installed in the bypass 484.

A measuring probe 490 may be connected to the bypass tube 484 to analyze the solids content of slurry flowing through the tube 484. The probe 490 provides a measurement signal 492. The measurement signal 492 can be processed using a processing unit 493.

In an embodiment, the measurement probe 490 may use a technique known as focused-beam reflectance Measurement© (FBRM©). Suitable probes are marketed by, for instance, N.V. Mettler-Toledo S.A. (Belgium). For a more detailed description of the technology and the functioning of the FBRM probe, reference is made to, for instance, Summary Report DOE/EM-0490, *Comparative Testing of Pipeline Slurry Monitors*, Prepared for U.S. Department of Energy, Office of Environmental Management Office of Science and Technology, September 1999 (Available via https://frtr.gov/pdf/itsr1547.pdf).

The primary output of the FBRM probe may be a chord length distribution (CLD) 494. This CLD is comparable to a particle size distribution (PSD) obtained by Laser Diffraction (LD) or Coulter Counter. The cord length distribution 494 can be depicted with number of particle counts 495 (y-axis) versus chord length 496 (x-axis). The chord length distribution based on counts ranges typically from 1 to 1000 microns, with peaks in the range of 5 to 10 microns. Particle counts may range from 1 to 1500 (or more) per unit of time.

The data processing unit 493 converts the cord length distribution 494 to number of total suspended solids (TSS). By applying a mathematical model 497, the total suspended solids are converted to concentration of total suspended solids 498, i.e. TSS per unit of volume (e.g. expressed in gram per liter).

The TSS concentration 498 is included in signal 320, for instance in analog (for instance 4-20 mA) or digital form, and it is sent to the control system 330. The control system 330 may share it with the APC system 310. The APC system herein is optional, in an embodiment, the system of the disclosure functions also with only control system 330. The system 300 as shown in FIG. 3, including the APC system 310, is an improved embodiment. The conversion of the cord length data 494 into a signal 320 can be done by applying a mathematical model, for instance using a variety of mathematical multivariable functions like linear, polynomial, exponential among others.

In a practical embodiment, the detected particle counts 495 are collected in one of a number of separate groups or bins, each representing a respective range of particle dimensions, according to their size, the measured chord length (cl). The data processing system 493 may use a predetermined number, for instance about 100, of respective size bins. These bins may be distributed across the size range 494, between 0 and the maximum dimension. The maximum dimension is, for instance, about 1000 μm.

For each bin $x_i$, a number of particle counts $n_1$ is given as outcome of the measurement, wherein i is the number of the respective bin, counting from the first to the last. In yet another improved embodiment, applicant has developed a mathematical model 497 that calculates the total suspended solids (TSS) from the chord length distribution (CLD) 494. In such model, all or some size bins can be used to calculate the TSS. For each bin i (e.g. from 1 to 100, or from a sub-range of bins selected from all the available bins) a weighting factor $c_i$ can be defined which multiplies the number of counts $n_i$ in that specific size bin as shown in the following equation:

$$TSS = \Sigma c_i n_i + b$$

The Data Conversion System 493 can also translate the measured particle counts 495 per size bin 496 into a total suspended solid value by using different mathematical models such as a general polynomial correlation.

$$TSS = \Sigma c_i n_i^x + b$$

The TSS is then calculated as summation of these products and a constant b.

The processing unit 493 can also translate the measured particle counts 495 per size bin 496 into a total suspended solid value by using different mathematical models such as a general polynomial correlation that includes the particle cord length $l_i$ that is affected by an exponent y.

$$TSS = \Sigma c_i n_i^x l_i^y + b$$

The TSS is then calculated as summation of these products and a constant b.

In the system 300 of the disclosure, the device 370 may include a system to calculate the TSS concentration. Flow rate of the slurry 114 can be calculated by mass balance or can be measured. Also, the temperature of the slurry 114 can be measured. The device 370, for instance as shown in FIG. 4, may use two restriction orifices 486, 488 to keep the flow rate of the slurry through the bypass tube 484 constant. Said flow rate will remain constant as long as the pressure in the gasifier 101 is substantially constant, which is typically the case for normal operating conditions of the gasifier.

The one or more sensors 360 to characterize the liquid hydrocarbon feed may comprise a Hydramotion XL7 viscometer. The sensor 360 may, for instance, be installed in one of the feedlines leading to the gasifier, or alternatively in a suction section of a recirculation pump. Based on ASTM Test Method D445, in the lab the kinematic viscosity is measured at 135° C. With the probe, a dynamic viscosity is measured at the temperature of the feedstock, which may range, for instance, between 170 and 200° C. Density of the feedstock may be in the order of 1 g/cm³. The kinematic viscosity of the feedstock [in mm²/s] may therefore be compared directly with the dynamic viscosity [measured in cSt]. Measured changes in feed viscosity may lead to operational adjustments such as for example adjusting the feed temperature or adjusting the throughput aiming at enhancing atomization in case of high feed viscosities that make atomization difficult and increase soot make.

In the gasification system 300 of the present disclosure, at least part of the syngas composition 140 can be determined online, i.e. in a substantially continuous manner by using a variety of analyzers. Determining at least part or all of the parameters defining the syngas composition 140 may be partly or fully automated.

The TSS concentration 374 and/or the C/A ratio 376 can be determined offline by sampling. However, in an improved embodiment, the device 370 can determine the TSS concentration 374 online. The TSS concentration may be determined substantially automatically and continuously. Continuously herein may include semi-continuously, including measurements at predetermined intervals. In another improved embodiment, the device 370 can determine the C/A ratio 376 online. Such correlation may be made assuming that the ash particles are smaller than a predetermined threshold size, for instance 10 microns. Another assumption may be that the particles are separated from soot.

The TSS concentration 374 can be determined automatically by device 370, as described with respect to FIG. 4.

The C/A-ratio 376 may, for instance, be determined in one of the following ways:

a. Offline: Samples of the feedstock will allow analysis in a laboratory to determine the ash content of the feedstock. The ash content in the feedstock will almost entirely end up in the waste slurry 114. As the ash content is known, and the load 132 (i.e. the feedstock supply rate) is known, the C/A-ratio can be derived from the online measurement of the TSS in combination with the slurry flow rate, i.e., the amount of carbon in the slurry stream 114 can be calculated as TSS minus the ash content of the feedstock compensated for the slurry flow rate. When the amount of carbon (C) is calculated, the amount of ash (A; i.e. ash in the slurry 114) is known, the C/A ratio 376 can be calculated as well.

b. Online: The TSS-measurement device 276 measures the cord length distribution of the soot particles in the slurry 114. It is known that, for a particular ash content in the feedstock 131, the cord length size of the soot particles increases with an increase in the C/A-ratio. This has been confirmed by laser diffraction analysis. For instance, for a particular gasification system, the dependence between the C/A-ratio and TSS can be determined by varying the TSS while keeping the ash content constant. This will influence the particle size distribution of the soot particles in the slurry 114. The C/A ratio may be determined online based on this dependence.

The viscosity 142 can be determined offline by sampling. In an improved embodiment, the viscosity 142 of the feed 131 can be determined online, using one or more sensors 360. The latter enables to substantially continuously and instantaneously measure the viscosity 142 of the feedstock as it is supplied to the gasifier 101. Online herein may mean that a certain value is measured directly. This means the measured value can be available continuously, substantially in real-time, The Advanced Process Control unit 310 may be adapted to control and optimize the gasification process and the partial oxidation in the gasifier 101 to allow for operation within a predetermined window of operation, for instance near a maximum design limit.

Figure 5:
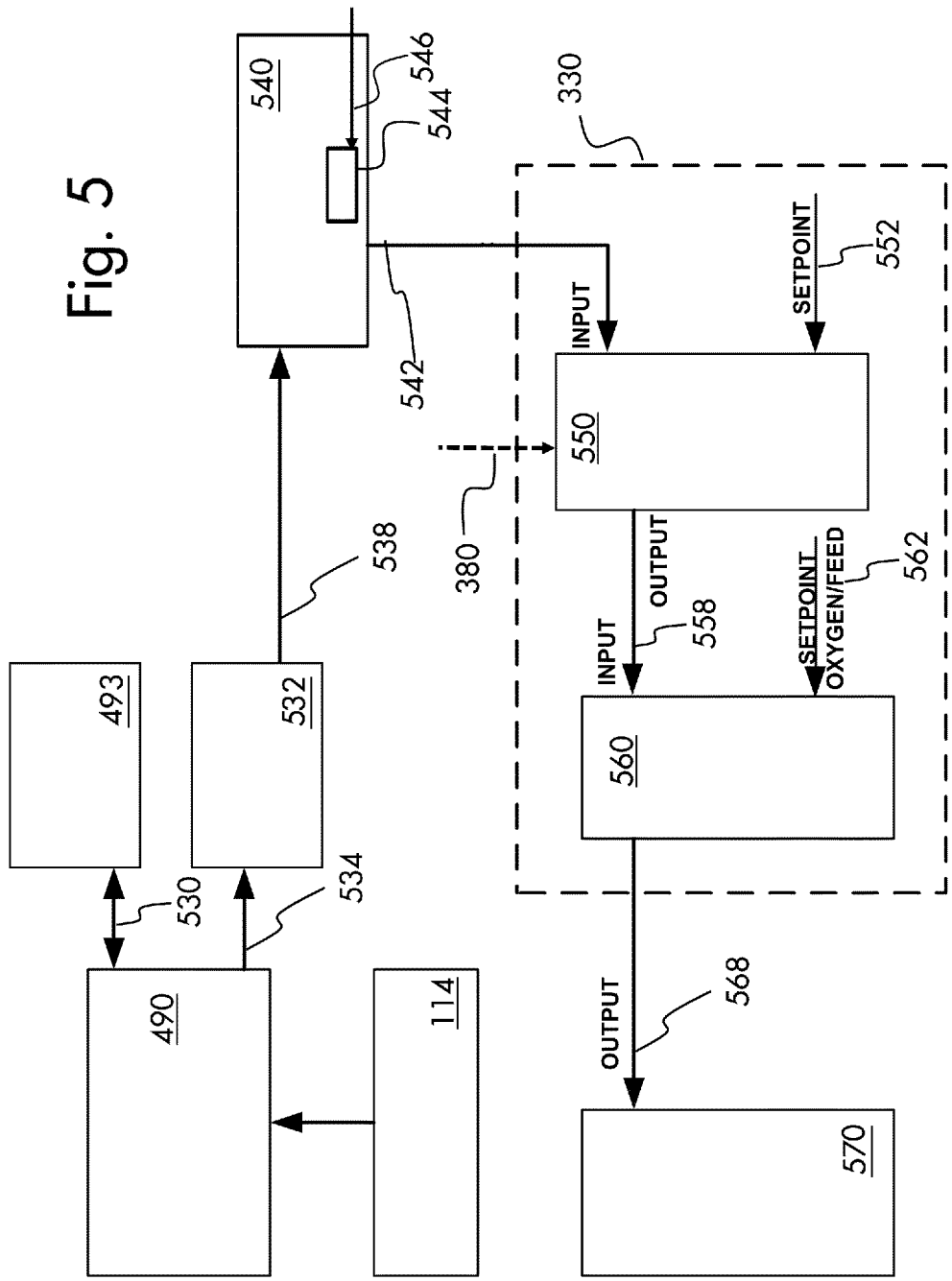
FIG. 5 shows an embodiment of a process control system for controlling the gasification process according to the present disclosure.
Figure 6:
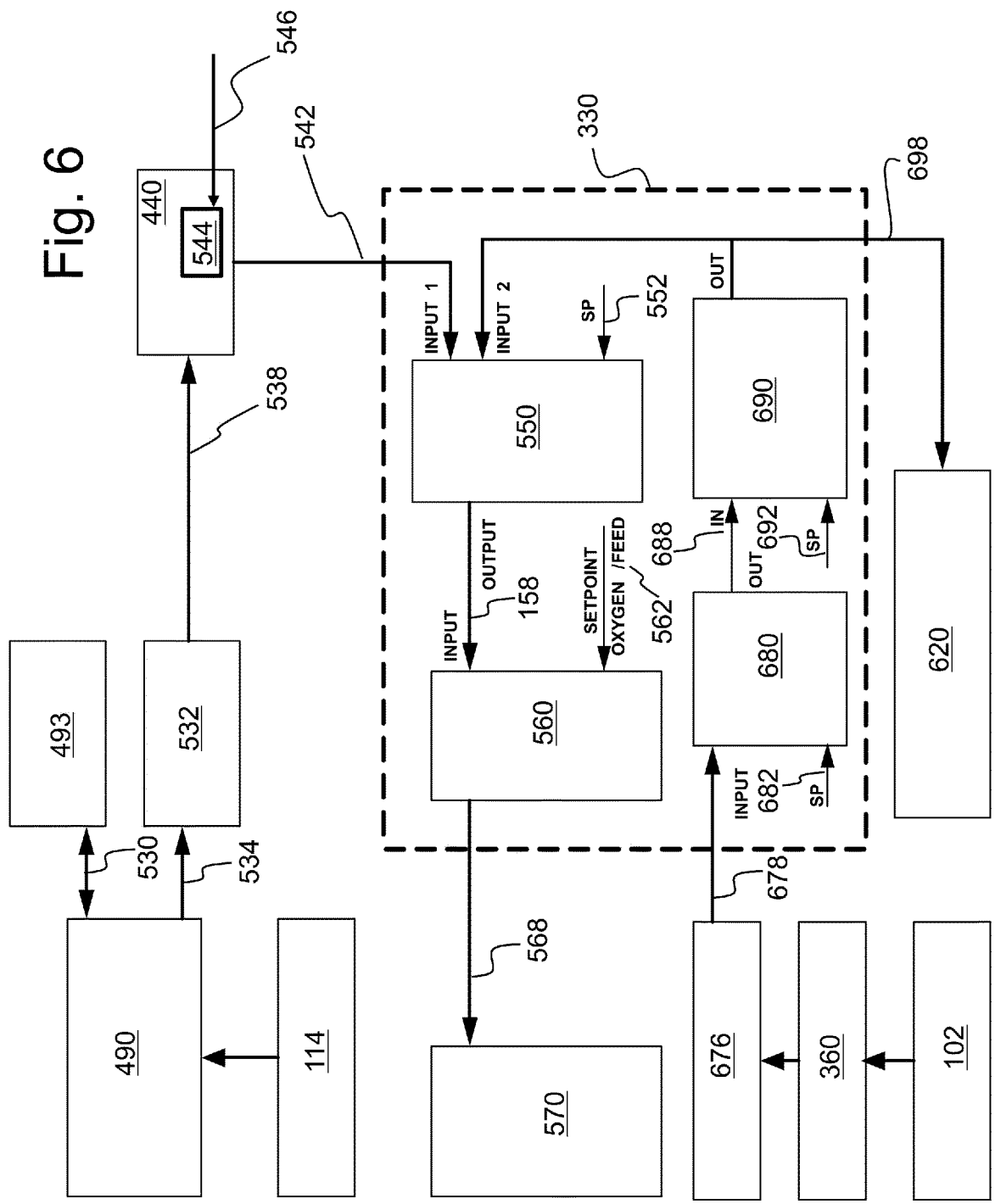
FIG. 6 shows another embodiment of a process control system for controlling the gasification process using multiple inputs such as TSS and feedstock viscosity according to the present disclosure.

FIGS. 5 and 6 describe embodiments of a control scheme involving the control unit 330.

In a practical embodiment, functioning of the control unit 330 may comprise, but is not limited to, any of the following steps, or include coupling to the following elements (See FIGS. 4, 5, and 6):

At least one sensing element. For instance the TSS probe or sensor 490, installed online for directly measuring one or more properties of the soot slurry 114. The probe or sensor 490 can be installed in the high and/or low-pressure sections of the soot slurry transport line. The probe or sensor 490 can be installed in the low pressure soot slurry line collecting all the soot slurry streams from one or more soot separators 108 that are processed by one slurry handling system 122. Other sensors may be included as well. For a typical gasification process, the TSS concentration may be in a range of 0 to 100 gram per liter. Most commonly, the range may be from 0 to 30 gram per liter. More precisely, the range may be from 0 to about 10 gram per liter (g/l);

A sensor control system 493. This could be a single device, or a set of devices providing power to the probe and/or controlling the operating settings of the sensing element via control line 530. The sensor control system may include an independent computer;

A sensor data gathering system 532 that collects raw data 534 from the sensor(s) 490 and provide a pre-processed data signal 538. For instance, the data gathering system may pre-process the raw data 534 by monitoring particle size distribution. The particle size distribution may be included in the pre-processed data signal 538, for instance as particle counts per time period per particle size range (i.e. per "bin") as explained above;

A data processing system 540 to convert the pre-processed data signal 538 into a processed data signal 542 usable by the control system 330. The control system 330 may include, or be connected to, a gasification unit control system (also referred to as Distributed Control System or DCS). See FIG. 7 for details. The processed data signal can be analog or digital or of other nature (wireless).

Optionally, the data processing system 540 may include a soot make control block 544. The soot make control block 544 can compare the value(s) of soot slurry characteristics comprised in the processed data signal 542 against a desired set point soot value 546. The set point soot value 546 may be defined by operators, or be automatically defined depending on the feedstock after input from the ash analysis in the feed. The control block 544 can change the value of the output signal, i.e. the processed data signal 542. The soot make control block 544 may include one or more mathematical correlations to correlate the output signal 542 to the input signal 538.

In an embodiment, the processed data signal 542 is provided to a soot make control block 550. The soot make control block compares the TSS concentration value in the processed data signal 542 against a soot make set point input 552. The soot make control block 550 may change an output signal 558 of the methane slip control loop when a difference between the soot and/or methane signal and its corresponding setpoint exceeds a predetermined threshold.

In another embodiment (not shown), the processed data signal 542 is directly provided to an oxygen control block 560. The oxygen control block controls the oxygen to feed ratio used in the operation of the gasifier 101. Herein, the oxygen control block 560 for instance provides an additional oxygen flow control input signal 568 to control an oxygen flow control valve 570. The oxygen flow control valve 570 in turn controls the flow rate of oxygen to the gasifier 101. The oxygen control block 560 thus may change the O2/Oil ratio of the gasification process and hence, the gasification severity. O2/oil ratio is proportional to gasification severity and inversely proportional to soot make.

In yet another embodiment, the soot make control block 550 forwards output oxygen flow control input signal 538 to the Oxygen/feed ratio control block 560. The Oxygen/feed ratio control block 560 subsequently compares the output signal 538 with an oxygen to feed ratio setpoint signal 562. The oxygen control block 560 may provide an oxygen control input signal 568 to an oxygen flow control valve 570, when a difference between the two values drops below or exceeds a predetermined threshold of the setpoint signal 562.

Typically, the TSS concentration in the waste slurry 114 is related to the methane slip. Said relation can be determined for a particular gasification system. The setpoint 552 for the methane control and/or the setpoint signal 562 for the oxygen control block 560 may be a range. If the TSS concentration exceeds the setpoint, or the maximum of the set range, the output signal orders to supply more oxygen to the gasifier. If the TSS concentration drops below the setpoint, or below a minimum threshold of the set range, the output signal 538 and/or the oxygen control signal 568 orders to supply less oxygen to the gasifier.

As shown in FIG. 6, in addition the process may comprise the optional steps of:

substantially continuously measuring the viscosity of the carbonaceous feedstock 131. The viscosity meter 360 measures the viscosity. The measured viscosity data is provided to a transmitter 676, which transmits the viscosity data to relevant parts of the process control system 330. The process control system for instance includes a viscosity control block 680. The latter compares the measured viscosity data 678 with a viscosity set point 682. The viscosity control block can change its output signal 688 depending on the result of comparing the viscosity input signal 678 with the setpoint 682.

The viscosity output signal 688 of the viscosity control block 680 can be provided to a feed temperature control block 690. The feed temperature control block may use the viscosity output signal 688 to control the feed temperature in cascade by modifying the feed temperature setpoint 692 by a factor. If a difference between the process feed temperature and the recalculated feed temperature setpoint 692 exceeds a predetermined threshold, the feed temperature control block 690 can provide a feed temperature control signal 698 to a feed temperature control system 620. The latter may include, for instance, a control valve for heated steam (to control the temperature of the feedstock 131 by (indirect) contact with heated steam) or with thermal oil (to control the temperature of the feedstock 131 by (indirect) contact with heated oil).

In an embodiment, the feed temperature control signal output 698 is also used as a secondary input of the soot make control block 550.

In addition, or alternatively, the viscosity control output signal 688 can be connected to the set point of the methane slip control block, also in cascade.

Exemplary embodiments of a basic process control system applying the invention of controlling the soot make have been described in the paragraphs above.

In an improved embodiment, it may be economically desirable to upgrade the control system by adding an additional layer of control with the aim of reducing fluctuations and being able to operate close to the design limits of the gasifier and the downstream units processing the soot. This can be achieved by implementing an advanced process control (APC) system 310 as shown in FIGS. 3 and 7. The APC system may be a physically separate computer or server or similar kind of processor that is added to, or connected to, the basic control system 330.

The APC system may comprise a number of Multivariable Control Optimizers (MCO). Each of them has a particular objective. For example, one objective could be to optimize soot make. Another objective could be to optimize H2 content in syngas. Each MCO needs input data. This input data is provided by, for instance, the DCS-1 200. There are several variable types that can be shared by the DCS-1. For example, manipulated variables 701 such as feed throughput, oxygen flow, steam flow, quench water flow. Controlled variables 702 such as feed temperature, oxygen temperature, CH4 slip in syngas, quench water flow, TSS. Disturbance variables 703 such as feed viscosity, ash content, density and calorific value. Process output variables 704 such as reactor temperature and/or syngas composition among others.

Manipulated variables 701 are variables having a setpoint that may be provided by the operator. They are mostly throughput related. Examples include feedstock throughput or load 132, oxygen flow 138, steam flow 136, and/or quench water flow.

Controlled variables 702 are variables that have a high impact on the output of the process. They are adjusted instantaneously and automatically by the basic control system 330 using a reference set point as input. Examples include feedstock temperature, oxygen temperature, methane content 160 in the cleaned syngas, quench water flow, total suspended solids 374 (in the waste slurry 114).

Disturbance variables 703 are variables that change arbitrarily. These variables cannot be controlled by operator or process control but are resulting from upstream processes. Examples are viscosity 142 of the feedstock, ash content 144 of the feedstock, feedstock density, calorific value of the feedstock.

Output variables 704 are variables that result from the gasification process after applying (changes to) the control. Examples include reactor temperature (i.e. temperature inside the reactor 101), and/or syngas composition (typically composition of the cleaned syngas 118).

Gasification Process Control unit 200 supplies the input data required to the APC system 310.

Similarly, a water-shift process control unit 720, or DCS-2 system, may provide water shift data to the APC system 310. The water shift data 721 may relate to a water shift reaction section included in downstream process 120, as explained above. The water shift data may include, for example, syngas flow intake, syngas inlet temperature, steam flow intake of the water shift reaction section, syngas feed temperature (i.e. temperature of the syngas 118 as it enters the water shift reaction section), reactor temperature of the water shift reaction section, and/or syngas outlet composition of the water shift reaction section. The DCS-2 system of the CO-shift system may also provide the water shift data 721 as a set of variables to the APC system 310.

With the input data, the APC system 310 may generate a Robust Quality Estimator-1 (RQE-1) 730 of the soot make. The RQE-1 may estimate the soot make in a future (short) time. Short herein may be, for instance, in the range of 1 minute, 10 minutes, 1 hour. The RQE-1 results from using a mathematical model. The RQE-1 will then provide input to the DCS-1 200 controlling the gasification system 101.

The DCS-1 may compare the future soot make against a target setpoint and then automatically make adjustments to the setpoints of gasification variables 731 so that they are gradually changed for obtaining an smooth adjustment towards a target soot make value. The gasification variables 731 may include one of more of feedstock flow rate or load, steam flow or oil to feedstock heater 620, oxygen flow 138, steam flow 136, quench water flow.

Another example is given by the generation of Robust Quality Estimator-2 (RQE-2) 740 by the APC system 310. RQE-2 may predict soot make and carbon-to-ash ratio in the future. This prediction can be supplied to the soot unit control system (DCS-3) 260, controlling the Soot Ash Recovery Unit 126. This input can be used to adjust the setpoints of variables 230 in the DCS-3 260 of the Soot Ash Recovery Unit to ensure a reliable operation. For instance, controlling temperature in the furnace depending on the amount of received soot with a certain carbon-to-ash ratio.

As mentioned earlier, it may be of economic interest to adjust the operation of the gasification unit 101 and treating units downstream of the gasifier to efficiently maximize the production of Hydrogen. A CO-shift conversion unit may typically also play a role in defining the hydrogen production. Hence, the APC system 310 can include an MOC model (for instance referred to as MOC-1) which aims at optimizing production of valuable products, i.e., hydrogen in this example. MOC-1 can produce a Robust Quality Estimator-3 (RQE-3) 750 that may predict the amount and quality of hydrogen in the (near) future. Near future herein may mean in the next 1 minute, 10 minutes, 1 hour. This information can then be supplied to the control system and compared against the desirable target set point.

Then, the DCS-2 760 can adjust the setpoints of operational variables 761 controlling the operation of the CO-shift unit to stir the operation such that the difference between the predicted hydrogen make and quality are closer to the desired objectives.

In addition to the information above, in a practical embodiment, the Advanced Process Control System 310 and/or the Robust Quality Estimators (RQE-1, RQE-2, and/or RQE-3) may use a system, or may include a method, as described in any of patent documents U.S. Pat. Nos. 9,268, 317, 9,122,261, or US-20160048113.

In a practical embodiment, the gasification process of the disclosure is for instance suitable to convert high ash, high sulphur and high viscosity feedstocks. The sulphur content of a residue feedstock can vary between, for instance, 0.01 wt % and 7 wt % or from 0.01 wt % and 15 wt %. The ash content in feed may vary in first instance from 0% to 20% w/w, and more precisely from 0 to 10%, and currently more commonly in a range of 0 to 0.5%.

In a practical embodiment, the gasification process may function within the following ranges of operation:
 feedstock temperature: may range from 40° C. to 400° C. In a preferred embodiment, feedstock temperature may be in the range of about 50° C. to about 350° C. This is typically dependent on the type of feedstock 131;
 feed viscosity: may range from 0 to about 1000 cSt, more narrowly from 0 to 300 cSt and typically from 0 to about 150 cSt;
 O2/feed ratio: may range from 0.8 to 1.4. In a preferred embodiment, O2/feed may range from 0.9 to 1.2 and typically in the order of 0.9 to 1.1;
 Steam/oil ratio: may range from 0.2 to 0.8. Typically, steam to oil (or steam or carbon ratio) may range from 0.3 to 0.7, or typically in the order of 0.4 to 0.6;
 methane setpoint: may be in the range of 0.05% to 1% volume/volume; more narrowly, methane content in the syngas may range from 0.1 to 0.5% volume/volume, or typically from 0.2 to 0.4% volume/volume.

The present disclosure is not limited to a quench section. There are other approaches conceivable, like the use of a venturi scrubber, or other combinations or types of scrubbers and/or quench sections.

The sensor for inline monitoring the TSS in the slurry of an oil gasification process (for instance within a range of particle sizes, for instance of particles up to 10 micron in diameter), can be based on—for instance—FBRM technology, laser diffraction, ultrasound, turbidimeter, or another instrument with that capability.

A computer-implemented Process Control system of the present disclosure may include the overall Basic Process Control system, plus an additional Advanced Process Control Layer with the aim of producing soot within a narrower window than when operating with the Basic Process Control system only. Such operating window can minimize soot make while maintaining the soot-to-ash ratio within a predetermined target range, of for example 2 to 10. A minimum amount of soot in the syngas is required to reduce the impact of the ash particles on the heat exchanger pipes. The system and method of the disclosure enable to maintain the soot to ash ratio in the range of, for instance, about 3 to 7.

Phrases as used throughout the present description may be defined as:
 "basic process control system" comprises one or more process control blocks (such as the DCS-1, DCS-2, DCS-3 etc.) to control the gasification process (but without the APC system 310);
 "advanced process control system" comprises a layer on top of the basic process control system (See for instance FIG. 3); and
 "process control system" comprises the "basic process control system" and the "advanced process control system".

The present disclosure relates to a process control system, optionally including an Advanced Process Control system, applied to gasification for the production of synthesis gas by partial combustion of a, typically liquid, carbonaceous feed. The disclosure is also directed to a method to control the syngas characteristics and/or the production of the gasification byproduct, i.e., soot.

The disclosure targets an extended Process Control system, optionally in combination with an Advanced Process Control system, for increasing the margin from a gasification process by optimizing the syngas composition and the production of the final product.

The automated process control of the present disclosure obviates the use of off-line checking of samples, and as a result enables faster response to changes in feedstock. This enables the system of the disclosure to process the residue stream of a more flexible refinery. Herein, a flexible refinery may be defined as a refinery which is able to buy and process different types of crude oil, often as opportunity arises typically due to fluctuations in spot prices on the market. The types of crude oil may differ in composition, for instance ranging from light oil to heavy oil and/or including more or less contaminants, such as sulphur. As a result, the refinery process upstream of the gasification process can change often, for instance from day to day or even more regularly. This may result in changes, or a wider variation, in the composition of the feedstock to the gasification process.

In an exemplary embodiment, the disclosure presents a system for precise control of soot make in a carbonaceous feedstock gasification system, the system comprising:
 gasifier inlet streams conditioning systems, the liquid hydrocarbon feed has to be heat-up to a target temperature that has an impact on viscosity. Also oxygen is heated for increasing efficiency of process. Steam is added as moderator and for controlling soot make;

a gasifier for partially oxidizing the carbonaceous feedstock to produce syngas;

a syngas effluent cooler (SEC) or waste heat exchanger (WHE) for cooling of the syngas and production of a high pressure steam;

an additional heat exchanger, economizer, to recover low quality heat by heating up BFW to increase process efficiency;

a quench section connected to the outlet of the economizer. The quench section being adapted to cool the syngas and to condense water around soot particles for their capture and incorporation into soot slurry;

a soot slurry separator for removing the quenching water containing the soot particles from the cooled syngas, the soot slurry separator being adapted to provide a relatively clean syngas stream and a waste soot slurry stream comprising the soot and ash solids removed from the syngas;

a scrubbing system which includes a section for further collection of soot particles from the syngas and returning them back to the quench pipe;

soot slurry transport line that withdraws soot slurry from the bottom of the soot separator and transports it to a flash vessel. The line includes a throttling valve to lower the pressure of the soot slurry;

a soot slurry sampling line that allows for a relatively small amount of soot slurry to bypass the throttling valve in the soot slurry transport line. The soot slurry sampling line is fitted with connections and a system for manually taking soot slurry samples, for instance of a volume around 1 liter;

a parallel soot slurry sampling line for the installation of an inline monitoring sensor to measure the Total Suspended Solids (TSS) in the soot slurry;

Alternatively the data collected by the monitoring sensor could be used to infer the soot/ash or carbon/ash ratio; and a basic and/or advanced process control system being adapted to substantially and continuously adjust the gasification parameters in the gasifier in response to changes in the concentration of total suspended solids in the soot slurry stream such that the soot make is maintained within a desirable narrow range.

A description of the control system abovementioned is as follows. The control system includes but is not limited to the following elements:

Sensing element. The probe, sensor, transmitter installed inline measuring the property(ies) of the soot slurry;

A sensor control system, which could be a set of devices providing power and controlling the operating settings of the sensing element. Those are usually controlled by an independent computer;

A sensor data gathering system that collects raw data from the sensor;

A data processing system to convert the raw data into a signal usable by the gasification unit control system (Distributed Control System). The signal can be of the following types: analog or digital;

A control block, called soot make control block, in the gasification unit DCS system that compares the value (s) of the signal containing the soot slurry characteristics information against a desired set point value defined by operators and then changes the value of an output signal which in turn changes either the set point of the control block of the methane slip control loop and/or the oil to feed ratio set point of the control block of the hydrocarbon feed flow. The soot make control block may include a mathematical correlation or a set of them to correlate the output signal to the input signal;

The control loop described above can be incorporated into an Advanced Process Control scheme as depicted in, for instance, FIGS. 3 and 7.

The TSS sensor of the disclosure can be incorporated not only in the waste slurry stream 114, but in any of the high pressure and low pressure streams in the gasification process and/or low pressure stream near the inlet of the soot and ash removal unit 126. Typically, the TSS sensor can be installed anywhere in streams 114 and/or stream 124.

The present disclosure is not limited to the embodiments as described above, wherein many modifications are conceivable within the scope of the appended claims. Features of respective embodiments may for instance be combined.

The invention claimed is:

1. A system for the gasification of a carbonaceous feedstock, the system comprising:
    a gasifier for partially oxidizing the carbonaceous feedstock to produce syngas;
    a cooling section connected to an outlet of the gasifier, the cooling section being adapted to cool the syngas to provide cooled syngas;
    a soot removal unit for removing solids from the cooled syngas, the soot removal unit being adapted to provide a cleaned syngas stream and a waste slurry stream comprising the solids;
    a TSS sensor adapted to substantially continuously monitor a concentration of total suspended solids (TSS) in the waste slurry stream; and
    a control system being adapted to substantially continuously optimize the oxidizing process in the gasifier in response to changes in the concentration of total suspended solids in the waste slurry stream.

2. The system of claim 1, wherein the carbonaceous feedstock comprises a liquid carbonaceous feedstock, a gaseous carbonaceous feedstock or a mixture thereof.

3. The system of claim 1, the control system comprising a basic process control system for controlling operation of, at least, the gasifier, the basic control system being adapted to adjust operation of the gasifier in response to changes in operating parameters, comprising at least the concentration of total suspended solids.

4. The system of claim 3, the parameters comprising syngas composition and/or soot make.

5. The system of claim 3, or the control system comprising an advanced process control system being adapted to adjust at least one setpoint of the basic process control system in response to changes in the concentration of total suspended solids.

6. The system of claim 3, wherein the basic process control system and/or the advanced process control system are adapted to adjust operation of the gasifier to maintain the concentration of total suspended solids (TSS) in the waste slurry stream within a predetermined range.

7. The system of claim 1, comprising a viscosity sensor adapted to substantially continuously measure viscosity of the carbonaceous feedstock.

8. The system of claim 7, wherein the viscosity of the carbonaceous feedstock is included in the operating parameters provided to the basic process control system and/or the advanced process control system.

9. The system of claim 1, the system comprising:
a gasifier inlet stream conditioning system, adapted to control a feedstock temperature of the carbonaceous feedstock.

10. The system of claim 9, the gasifier inlet stream conditioning system being adapted to control the oxygen feed temperature of an oxygen comprising feed stream to the gasifier.

11. The system of claim 1, comprising a soot slurry transport line connected to a bottom of the soot removal unit for transporting the waste slurry stream from the soot removal unit to a slurry handling system.

12. Process for the gasification of a carbonaceous feedstock, the process comprising the steps of:
partially oxidizing the carbonaceous feedstock in a gasifier to produce syngas;
guiding the syngas from an outlet of the gasifier to a cooling section;
cooling the syngas in the cooling section to provide cooled syngas;
providing the cooled syngas to a soot removal unit;
using the soot removal unit to remove solids from the cooled syngas, the soot removal unit providing a cleaned syngas stream and a waste slurry stream comprising the solids removed from the syngas;
substantially continuously monitoring a concentration of total suspended solids (TSS) in the waste slurry stream;
providing the concentration of total suspended solids (TSS) to a control system; and
the control system substantially continuously optimizing the step of partially oxidizing the carbonaceous feedstock in response to changes in the concentration of total suspended solids.

13. The process of claim 12, the control system comprising a basic process control system for controlling operation of, at least, the gasifier, the basic process control system being adapted to adjust operation of the gasifier in response to changes in operating parameters, comprising at least the concentration of total suspended solids.

14. The process of claim 13, the control system comprising an advanced process control system being adapted to adjust at least one setpoint of the basic process control system in response to changes in the concentration of total suspended solids.

15. The process of claim 12, the step of the control system substantially continuously optimizing the step of partially oxidizing the carbonaceous feedstock comprising substantially continuously adjusting operation of the gasifier to maintain the concentration of total suspended solids (TSS) in the waste slurry stream within a predetermined range.

16. The process of claim 12, comprising the step of:
substantially continuously measuring the viscosity of the carbonaceous feedstock;
providing the measured viscosity to the control system; and
the control system optimizing the gasification process in response to changes in the viscosity of the carbonaceous feedstock.

17. The process of claim 12, comprising the step of:
determining a carbon-to-ash ratio (C/A ratio) of the solids in the waste soot slurry;
providing the carbon-to-ash ratio to the control system; and
the control system optimizing the gasification process in response to changes in the carbon-to-ash ratio of the solids in the waste slurry.

18. The process of claim 12, the step of providing the concentration of total suspended solids (TSS) to the control system comprising:
measuring the solids to provide measured suspended solids;
analyzing the measured suspended solids in the waste slurry stream to provide a particle count;
providing the particle count per size bin to a processing unit which uses a mathematical correlation to translate the particle count per size bin into a total suspended solids value; and
sending the total suspended solids value to the control system.

19. The process of claim 12, the step of the control system substantially continuously optimizing the gasification process in response to changes in the concentration of total suspended solids comprising:
feeding the concentration of total suspended solids as an input to at least one control block in the control system;
the at least one control block providing an output signal; and
adjusting one or more final elements (such as control valves) of the gasification process based on the output signal of the at least one control block, or using the output signal as input for one or more other control blocks within the control system.

20. The process of claim 12, comprising the step of determining the composition of the cleaned syngas in terms of CH4, H2, CO, and/or CO2.

* * * * *